3,193,382
PROCESS FOR THE RECOVERY OF ZINC FROM ZINC PLANT RESIDUES
Herbert O. K. Veltman, Edmonton, Alberta, Canada, and Edward Whayman and Curzon John Haigh, Moonah, and Ralph Watt Pickering, Sandy Bay, Tasmania, assignors to Sherritt Gordon Mines Limited, Toronto, Ontario, Canada, a company of Canada
No Drawing. Filed Jan. 9, 1963, Ser. No. 250,215
3 Claims. (Cl. 75—115)

This invention relates to the hydrometallurgical extraction of zinc from ferritic material, and more particularly it relates to the recovery of zinc from zinc plant residues.

The term "zinc plant residues," as used herein, refers to the undissolved residue remaining when oxidized or almost completely oxidized zinc sulphides are leached with an aqueous sulphuric acid solution in the normal course of the conventional electrolytic zinc process.

In this conventional process, zinc oxide, such as derived from roasting zinc sulphides in an oxidizing atmosphere, is leached with an aqueous sulphuric acid solution. The zinc sulphate solution derived from the leaching operation is purified and the zinc recovered from the solution by electrolysis. Sulphuric acid is regenerated during the electrolysis, and the "spent" electrolyte, which may contain in excess of 150 grams per litre free sulphuric acid, can be re-cycled to the zinc oxide leaching step.

It is well known that during the roasting operation, at least some of the iron present in the starting material combines with zinc to form zinc-iron compounds such as zinc ferrite, generally believed to have the formula $ZnFe_2O_4$. This zinc ferrite is not dissolved in the sulphuric acid solution used in the zinc oxide leaching step referred to above. As a result, the residue from the leaching stage may contain a substantial quantity of zinc in the form of zinc ferrite which is insoluble in the zinc oxide leaching step and is thus lost to the process. It usually also contains some zinc sulphide, the actual amount being dependent on the completeness of the oxidation roasting operation. Commonly, such residues contain from about 20 to about 25% zinc of which from about 75 to 90% may be in the ferrite form and much of the balance is present as zinc sulphide. The residue, usually, will also contain other valuable metals such as lead and silver not dissolved during the leaching operation.

Various methods have been suggested for the recovery of the zinc values from these residues, such as, for example, roasting the residue with concentrated sulphuric acid to solubilize the zinc values. Also, leaching the residue at elevated temperatures and pressures with concentrated sulphuric acid has been suggested. However, none of these methods have been commercially acceptable, primarily because of the serious corrosion problems and the high capital cost of corrosion resistant equipment.

Recently, it has been discovered that economically practical recoveries of the zinc content of zinc plant residues can be extracted by leaching the residue with a dilute sulphuric acid leach solution at elevated temperature. This process which is the subject of United States Patent No. 3,143,486 to Whayman et al., involves, in brief the application of the following conditions:

(a) The use of elevated temperatures above the normal boiling point of the leach solution at atmospheric pressure, the rate of zinc extraction increasing with the reaction temperature.

(b) The use of excess acid over that required for dissolution of the zinc content of the residue, the rate of zinc extraction increasing with this excess.

(c) The use of non-oxidizing conditions in a first stage pressure leaching treatment at elevated temperature, followed by a second stage pressure leaching treatment at elevated temperature and under oxidizing conditions, such as supplied by maintaining the reaction vessel under a positive partial pressure of oxygen, to oxidize ferrous iron dissolved or formed in the first stage, and to take into solution any minor quantities of zinc remaining in the residue.

In its preferred form, this process comprises the steps of mixing zinc plant residue with sulphuric acid solution, which can be derived from the electrolyte discharged from the cells in which zinc sulphate is electrolyzed for the production of zinc, to form a slurry which contains, preferably, from about 10% to 30% solids. The reaction mixture should contain a minimum of about 150% of the stoichiometric acid requirement of the zinc in the residue as zinc sulphate, that is, about 50% acid in excess of that required to combine with the zinc as zinc sulphate. Preferably, the pulping is conducted at a temperature at or slightly below the boiling point of the slurry at atmospheric pressure to partially leach the residue and reduce the free acid content and so reduce the corrosion hazard in the first stage pressure leaching step. Heat for this pulping or digestion step can be supplied by steam recovered from the second stage pressure leach step, thus effecting a substantial saving in heating fuel costs.

The resulting slurry is then heated with agitation and in the absence of oxygen in a closed pressure vessel to a temperature above the normal boiling point of the solution at atmospheric pressure, preferably within the range of about 150° C. to about 220° C., to achieve a rapid rate of attack on the zinc ferrite content of the residue.

Iron also is dissolved from the ferritic material in this leaching step, but at the elevated temperatures used, ferric iron in solution readily hydrolyses and is substantially precipitated as a basic sulphate. Ferrous iron may be dissolved from the residue or formed by a reaction of the general type:

(1) $Fe_2(SO_4)_3 + ZnS \rightarrow 2FeSO_4 + ZnSO_4 + S$ (elemental)

This ferrous iron sulphate is substantially completely oxidized in the second stage pressure leaching step in which the leaching is continued at an elevated temperature, preferably from about 150° C. to 200° C., in the presence of oxygen or a free-oxygen containing gas, such as air, and the resulting ferric iron hydrolyses and precipitates from the solution as basic iron sulphate, thus reducing the final iron content of the leach solution.

An important feature of the process described above is the use of non-oxidizing or neutral conditions, such as created by an atmosphere of nitrogen or steam, during dissolution of zinc from the ferritic materials in the first stage pressure leach.

We have now found that the rate of zinc ferrite dissolution can be substantially improved with a corresponding increase in the extraction and dissolution of zinc in the overall process by ensuring that reducing conditions, rather than neutral conditions exist in the first stage leach such as are produced by the addition of additives which function as reducing agents under the conditions of the leaching reaction. For such reducing agents to be fully effective, it is necessary that air or oxygen be excluded from the first stage leach. In the treatment of sulphide deficient residues, benefits in reaction rate can be obtained by the introduction into the reaction mixture of reducing agents such as additional sulphides, for example, zinc sulphides, or other reducing reagents not normally present in reaction mixtures of this type.

It has also been found that the improvement in reaction rates under the above conditions depends on the severity of the reducing conditions imposed. For example, it has been found that the addition of a small amount of hydrazine sulphate to a residue which contained 3% sulphide sulphur resulted in an increase in the rate of zinc extraction in the absence of oxygen, over that obtained with the residue alone. Likewise, the addition of sulphur dioxide, zinc dust, or other reducing agents or additives which have reducing properties under reaction conditions has a similar effect. An increased rate of zinc extraction has been obtained by the addition of reducing agents in the treatment of residues almost completely deficient in sulphide sulphur.

As a result of the addition of such reducing agents, to facilitate the decomposition of zinc ferrite, the amount of ferrous iron formed during the reaction increases. If a sufficient quantity of reducing agent is added, all the iron present in the original residue can be dissolved in the solution as ferrous sulphate. The removal of both constitutents of the zinc ferrite from the residue results in an enrichment of the residue in the insoluble valuable metal content, and, if desirable the remaining solids can be separated from the solution such as by filtration, before it is subjected in the second stage leach to iron removal by oxidation and hydrolysis. The solid removed after the first stage leaching treatment can then be treated if desired, by any conventional means for the recovery of any valuable constituents associated therewith, such as lead and silver.

The formation of large quantities of ferrous iron in the first stage leach usually necessitates longer reaction times in the oxidizing second stage leach, for the removal of the iron. There usually will be, therefore, some point at which the improvement in the reaction rate in the first stage is offset by the longer reaction times required in the second stage oxidation leach. The mode of operation of the present improved process, i.e., the quantity of reducing agent added, and possible inter-stage liquid-solid separation, normally depends on specific operating and economic considerations which can be readily determined having regard to the specific material subjected to treatment.

The following examples illustrate the practice of the present invention and the improved results obtainable therefrom.

EXAMPLE 1

A sample of zinc plant residue containing 21.5% of zinc was roasted under oxidizing conditions to reduce the sulphide sulphur content from 0.9 to 0.04%. 2.75% zinc sulphide concentrate having a zinc content of 50.2% and sulphide sulphur content of 31.0% to produce a total sulphide sulphur content of 0.9% was added to part of the roasted calcine. Two samples of the roasted residue, one with and one without the zinc sulphide concentrate addition, were separately leached with aqueous sulphuric acid in a one gallon autoclave at 180° C. and under a partial pressure of nitrogen of 50 pounds per square inch. The solids content of the reaction mixture was 126 grams per litre in each case. The leach solution used was recycled zinc plant electrolyte having an initial sulphuric acid concentration of 105 grams per litre. Samples were withdrawn from the autoclave during each test and the zinc content of the washed and dried filter cakes from the filtered samples were determined. The leach contents of the washed cakes were used to correct for changes in the actual weight of residue during the tests, and so enable the zinc extractions at the time of sampling to be calculated.

Results are set out in the following Table 1:

| Time at 180° C. in minutes | Percent Zn Extraction | |
|---|---|---|
| | No added sulphide concentrate | 2.75% concentrate added |
| 30 | 36 | 36 |
| 60 | 40 | 44 |
| 120 | 43.5 | 54 |
| 240 | 53.5 | 70 |

It will be noted that the rate of zinc extraction and dissolution is increased from 53.5% to 70% by weight of the zinc contained in the starting material by the addition of sulphide sulphur to the reaction mixture.

EXAMPLE 2

43 grams of a zinc plant residue which contained moisture, 22% zinc based on the dry weight, and 2.5% sulphide sulphur were mixed with 2 grams of hydrazine sulphate and 300 grams of spent zinc plant electrolyte which contained 107 grams of sulphuric acid per litre. This mixture was heated in a stainless steel autoclave, with agitation, to 160° C. and maintained at that temperature for 60 minutes. After cooling, the reacted mixture was removed from the autoclave, filtered, washed and dried. The zinc content of the solids residue, which weighed 33.5 grams, was found to be 5.2%, indicating a zinc extraction of 79%. The corresponding extraction from a duplicate run under a nitrogen atmosphere without the hydrazine addition, was only 63%.

Example 3 illustrates the improved effect of the addition of sulphur dioxide to the first stage leach.

EXAMPLE 3

A sample of spent zinc plant electrolyte which contained 57.8 grams of zinc per litre and 90 grams of sulphuric acid per litre was partially saturated with sulphur dioxide at room temperature. An aliquot of this solution was treated with potassium iodate and analysed for sulphuric acid. This was found to be 141 grams $H_2SO_4$ per litre, indicating a sulphur dioxide content equivalent to 51 grams $H_2SO_4$ per litre. 300 cubic centimetres of this solution together with 37 grams of dry residue which contained 2.6% by weight, sulphide sulphur and 22% by weight, zinc were charged into a one litre stainless steel autoclave, the autoclave was sealed and heated with agitation of the slurry to 100° C. A sulphur dioxide pressure of 40 pounds per square inch developed in the autoclave at this temperature because of the decrease in solubility of sulphur dioxide in the solution at 100° C. After 60 minutes at 100° C. the autoclave was purged with oxygen and the temperature increased to 180° C. This second stage leach was continued for 60 minutes at 180° C. under a partial pressure of oxygen, supplied by feeding a stream of oxygen into the autoclave, of 120 pounds per square inch. The autoclave was cooled, the contents removed, filtered and analysed. The zinc content of the undissolved residue, which weighed 38 grams was 1.8% indicating a zinc extraction of 92%. The iron content of the filtrate was 3.6 grams per litre indicating that oxidation and hydrolysis of iron was adequate in 60 minutes at 180° C.

By comparison, when sulphuric acid, in an amount equivalent to the sulphur dioxide of Example 3, was added instead of the sulphur dioxide, the other conditions being the same, the steam generated constituting the atmosphere during the first stage treatment, the weight of undissolved residue was 37 grams. The zinc content of the residue was 3.19% indicating an extraction of only 82.5%. The iron content of the filtrate was 5.0 grams per litre.

This comparison illustrates that the use of sulphur dioxide in the first stage of a two stage pressure leaching process leads to a greatly improved extraction of zinc.

In two tests similar to Example 3, in one of which sulphur dioxide was added, and in the other an equivalent sulphuric acid addition, the tests were terminated at the end of the first stage leach and the contents of the autoclave were removed and analysed. In the test using sulphur dioxide, the weight of undissolved residue was 12 grams, and it contained by weight 18% zinc, 1% iron and 8.3% sulphide sulphur. These results indicate a zinc extraction of 73% and illustrate that the ferritic zinc has been substantially dissolved in the first stage leach.

In the comparison test, in which sulphuric acid was added instead of sulphur dioxide, the weight of undissolved residue was 24 grams, and it contained 17% zinc, indicating an extraction of only 56% of the zinc.

The results of these latter tests illustrate that the benefits to be gained by the use of sulphur dioxide as the reducing agent are pronounced in the first stage of a two stage pressure leaching process, and that the second stage is mainly concerned with the oxidation and dissolution of the zinc sulphide content of the residue and the oxidation and consequent hydrolysis of dissolved iron.

Advantages resulting from the use of a reducing condition in the first stage treatment include the increased rate of attack on the zinc ferrite content of the residue; the ability to treat different types of residues under standard conditions by the controlled addition of reducing agents; and the reaction temperature required may be lowered if desirable, while still obtaining improved results in terms of rates and completeness of the reaction. Also, if the reducing agent used is a sulphur compound, this may subsequently be converted to sulphuric acid in the second stage oxidation leaching step to compensate wholly or in part for any losses of such acid resulting from the precipitation of basic ferric sulphates.

It will be understood that modifications may be made in the improved process of this invention without departing from the scope of the invention defined by the appended claims.

What we claim as new and desire to protect by Letters Patent of the United States is:

1. In a process for the extraction of zinc from zinc plant residue containing zinc ferrite in which the residue is subjected to a first stage pressure leaching treatment in a substantially oxygen free atmosphere in a closed vessel at a temperature between 150° C. and 220° C. in the presence of sulphuric acid in excess of that stoichiometrically equivalent to the zinc in the residue, and then said residue is subjected to a second stage pressure leaching treatment under oxidizing conditions in a closed vessel in the presence of sulphuric acid at a temperature between 150° C. and 200° C., the improvement which comprises conducting the first stage leaching treatment in the presence of a reducing agent selected from the group consisting of zinc sulphide, metallic zinc powder, sulphur dioxide and hydrazine sulphate in amount sufficient to produce reducing conditions in said first stage.

2. An improved process as claimed in claim 1 in which the reducing agent is zinc sulphide.

3. An improved process as claimed in claim 1 in which the reducing agent is sulphur dioxide.

References Cited by the Examiner
UNITED STATES PATENTS

| | | | |
|---|---|---|---|
| 1,378,699 | 5/21 | Lloyd | 75—115 |
| 1,467,516 | 9/23 | Tainton | 75—101 |
| 1,779,841 | 10/30 | Fischer | 75—120 |
| 1,825,949 | 10/31 | Haas | 75—101 |
| 2,662,009 | 12/53 | Roberts et al. | 75—120 |

BENJAMIN HENKIN, *Primary Examiner.*